(12) United States Patent
Johnson et al.

(10) Patent No.: US 6,789,781 B2
(45) Date of Patent: Sep. 14, 2004

(54) REINFORCED DIAPHRAGM VALVE

(75) Inventors: Michael W. Johnson, St. Louis Park, MN (US); Jeffrey J. McKenzie, Watertown, MN (US)

(73) Assignee: Entegris, Inc., Chaska, MN (US)

( * ) Notice: Subject to any disclaimer, the term of this patent is extended or adjusted under 35 U.S.C. 154(b) by 67 days.

(21) Appl. No.: 10/101,443

(22) Filed: Mar. 18, 2002

(65) Prior Publication Data

US 2002/0158222 A1 Oct. 31, 2002

Related U.S. Application Data

(60) Provisional application No. 60/276,658, filed on Mar. 16, 2001.

(51) Int. Cl.[7] .............................................. F15K 27/00
(52) U.S. Cl. ....................................... 251/291; 251/331
(58) Field of Search ................................. 251/291, 292, 251/331, 358; 137/454.2, 454.6

(56) References Cited

U.S. PATENT DOCUMENTS

| | | | |
|---|---|---|---|
| 1,992,043 A | * | 2/1935 | Saunders ................. 251/331 X |
| 3,407,838 A | * | 10/1968 | Boteler .................... 251/331 X |
| 3,488,824 A | * | 1/1970 | Boteler .................... 251/331 X |
| 4,538,638 A | * | 9/1985 | Stack ...................... 251/331 X |
| 4,545,565 A | * | 10/1985 | Sano et al. ................... 251/331 |
| 4,848,802 A | | 7/1989 | Wolf et al. |
| 4,917,143 A | * | 4/1990 | Grooms ...................... 137/343 |
| 4,929,293 A | | 5/1990 | Osgar |
| 4,977,929 A | * | 12/1990 | Chinnock et al. ........ 251/331 X |
| 5,205,539 A | * | 4/1993 | Schalk ........................ 251/331 |
| 5,279,328 A | | 1/1994 | Linder et al. |
| 5,297,773 A | | 3/1994 | Collins et al. |
| 5,327,937 A | | 7/1994 | Kato et al. |
| 5,335,696 A | | 8/1994 | McKenzie |
| 5,368,452 A | | 11/1994 | Johnson et al. |
| 5,377,956 A | | 1/1995 | Müller |
| 5,472,244 A | | 12/1995 | Nishikata et al. |
| 5,520,213 A | | 5/1996 | Müller |
| 5,837,180 A | | 11/1998 | Linder et al. |
| 5,924,441 A | | 7/1999 | Leys et al. |
| 6,007,045 A | * | 12/1999 | Heiniger et al. ........ 251/331 X |
| 6,056,264 A | | 5/2000 | Benson et al. |
| 6,289,933 B1 | | 9/2001 | Fischer |

FOREIGN PATENT DOCUMENTS

JP          10132101 A2          5/1998

OTHER PUBLICATIONS

SANG–A FLONTEC CO., LTD.; Teflon Products: Anti-Corrosion Lining System; Catalog excerpt showing a PFA lined steel body valve.

* cited by examiner

*Primary Examiner*—Eric Keasel
(74) *Attorney, Agent, or Firm*—Patterson, Thuente, Skaar & Christensen, P.A.

(57) ABSTRACT

A reinforced plastic valve apparatus in a preferred embodiment comprises an upper valve portion, a lower valve portion, an endoskeletal structure configured as a weir support or reinforcing member and an exoskeletal framework configured as a support collar. The upper valve portion preferably includes an upper plastic valve housing or body, a resilient diaphragm and a valve actuator. The lower valve portion comprises a lower plastic valve housing or body that is preferably configured to mate with the upper valve housing to define a valve interior. The lower valve body preferably has an integral weir which, in conjunction with the resilient diaphragm, defines a fluid passage. The diaphragm is configured to sealingly engage and disengage with the weir as effected by the valve actuator. The weir support member is disposable within the lower housing to support the weir.

16 Claims, 9 Drawing Sheets

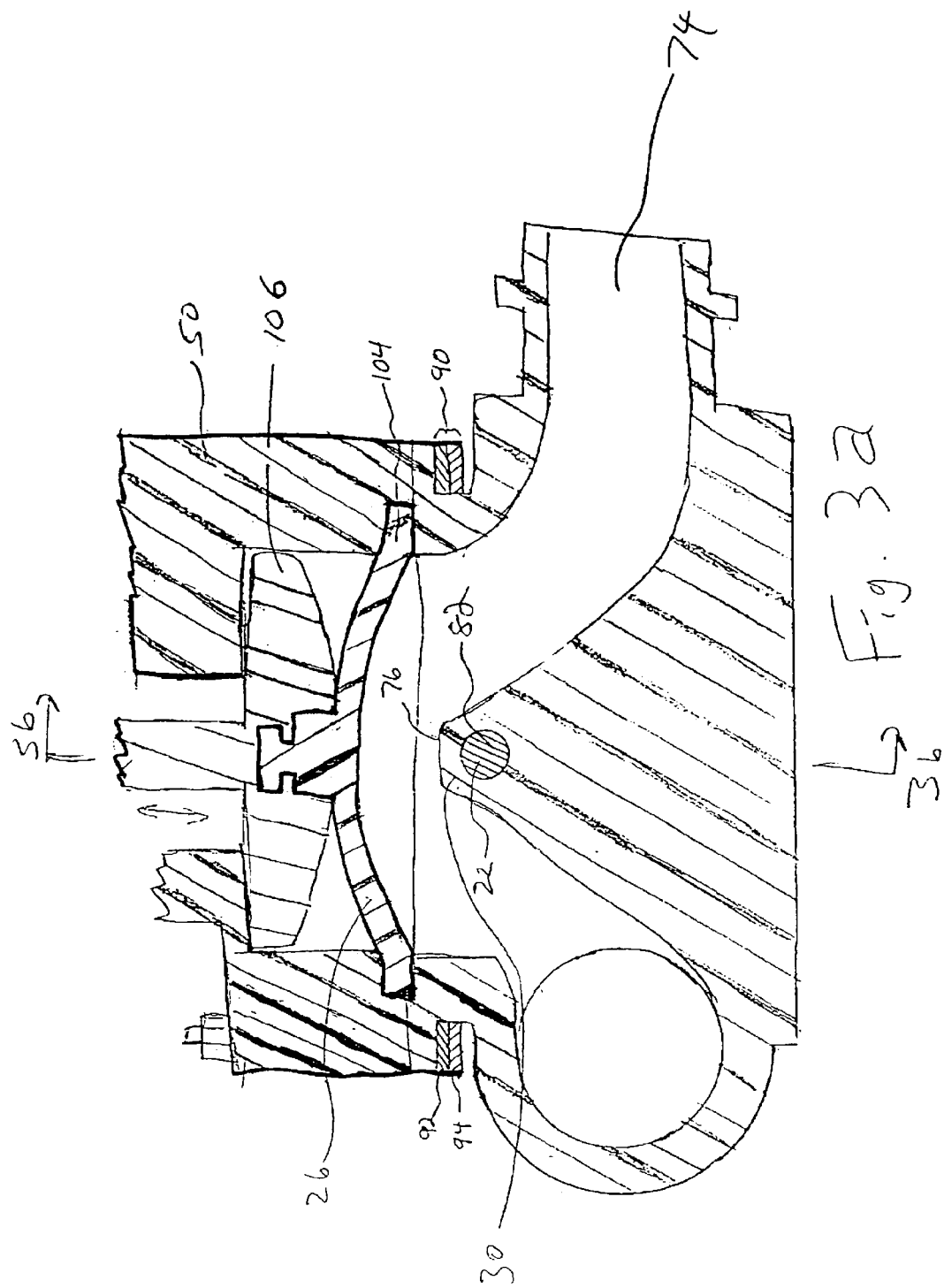

REINFORCED DIAPHRAGM VALVE

RELATED APPLICATION INFORMATION

This application claims benefit of U.S. Provisional Application No. 60/276,658, filed on Mar. 16, 2001.

FIELD OF THE INVENTION

The present invention relates to valves, and more particularly, to plastic diaphragm valves having a weir-type seating surface.

BACKGROUND OF THE INVENTION

Diaphragm valves provide excellent sealing and isolation characteristics to contain fluid being controlled and prevent migration of the controlled fluid into the valve mechanisms or out of the valve. Diaphragm valves utilize a resilient diaphragm and a valve shoulder to engage a valve seat and prevent the flow of fluid past the valve seat. A weir-type diaphragm valve is a valve utilizing a resilient diaphragm that engages a weir to control flow of fluid over the weir. The diaphragm may be controllably lifted and sealed against the weir to selectively permit flow through the valve.

Weir-type diaphragm valves are often employed in the biotechnological, pharmaceutical, chemical, food processing, beverage, cosmetic, and semiconductor industries. These industries often require valves that protect against product contamination and leakage within the valve, workplace and atmosphere. Weir-type diaphragm valves are well suited to meet these requirements because the mechanical valve parts are isolated from fluid flowing through the valve.

Traditionally, diaphragm valves were made of metal alloys. Such metal valves provide good durability and service life in basic fluid control applications. However, metal alloys are not well suited to some process environments, such as pharmaceutical and semiconductor manufacturing. In those applications, the fluids often used are highly corrosive or caustic and also must be kept ultra pure. These corrosive fluids can erode the metal from the valve body and contaminate the ultra pure process fluids. Also, some metal alloys may act as catalysts causing the process fluids to undergo chemical reactions, thereby compromising end products, and potentially, worker safety.

Specialized high strength alloys and stainless steels have been developed to minimize reactivity and erosion in the valve bodies. However, such specialized alloys are very difficult to cast or machine into valve components. The resulting valves are very costly to purchase relative to traditional metal valves. Moreover, stainless steel is not suitable in particular applications such as the semiconductor processing industry.

Plastic lined metal valves were developed to allow traditional metal valve bodies to handle caustic fluids in specialized process applications. The metal valve body is first formed by casting or machining. Then, a plastic or fluoropolymer is molded in the interior of the valve body where process fluids contact the body. U.S. Pat. No. 4,538,638 discloses a plastic lined metal bodied diaphragm valve.

Although, the plastic lined metal valves and plastic lined plastic valves may provide the desired resistance to degradation by process fluids, manufacturing costs are high. High costs are attributable to the complicated multi-step manufacturing process of molding a plastic lining in a support body. The plastic lining may be subject to creep with respect to its surface underneath. Creep reduces the useful life of the expensive plastic lined valve.

Through advances in plastics and manufacturing technologies, valves made entirely or almost entirely of fluoropolymers have become commercially viable. Such plastic valves are capable of providing a cost effective valve having desirable non-reactive and corrosive resistant properties ideally suited for use in pharmaceutical and semiconductor manufacturing applications. U.S. Pat. Nos. 5,279,328 and 4,977,929 disclose plastic diaphragm valves. In certain applications, plastic bodied valves may also be provided with a plastic lining. U.S. Pat. No. 4,538,638 discloses a plastic lined diaphragm valve.

While fluoropolymer valves and plastic valves having fluoropolymer liners are well suited to withstanding caustic fluids, they are susceptible to dimensional degradation such as warpage and creep. Fluids used in industrial processes, such as the pharmaceutical, sanitary, and semiconductor industries, generally require the process fluids to be kept ultra pure. Components used in fluid delivery systems, such as valves, are routinely cleansed to ensure that contaminants do not become trapped in such components and thereby introduced into the process system.

The cleansing processes may involve exposure to high temperature steam for a sufficient amount of time to sterilize the component. Particularly when repeated numerous times, this sterilization process can cause the plastic in the valve to change dimension slightly, resulting in warpage. Creeping results when plastic is subject to stress over a period of time. The plastic component's dimensions can change from the stress. Due to such warpage and creep, tolerances, especially at the weir, are affected and leakage may result. Therefore, a need exists to provide a plastic lined weir-type diaphragm valve that has improved dimensional stability when exposed to repeated cleansing operations or exposure to conditions normally conducive to warpage or creep.

SUMMARY OF THE INVENTION

A reinforced plastic valve apparatus in a preferred embodiment comprises an upper valve portion, a lower valve portion, an endoskeletal structure configured as a weir support or reinforcing member and an exoskeletal framework configured as a support collar. The upper valve portion preferably includes an upper plastic valve housing or body, a resilient diaphragm and a valve actuator. The lower valve portion comprises a lower plastic valve housing or body that is preferably configured to mate with the upper valve housing to define a valve interior. The lower valve body preferably has an integral weir which, in conjunction with the resilient diaphragm, defines a fluid passage. The diaphragm is configured to sealingly engage and disengage with the weir as effected by the valve actuator. The weir support member is disposable within the lower housing to support the weir. In preferred embodiments, an exoskeletal framework configured as the support collar extends circumferentially around the valve and supports the weir support member. In particular embodiments, the valve body components may also comprise a plastic fluoropolymer lining for contacting fluids. The invention also includes the method of manufacturing a reinforced plastic valve preferably including the step of providing a rigid support member to the weir of a lower valve housing.

A plastic diaphragm valve apparatus may comprise an upper valve housing, the upper housing including a resilient diaphragm and means for actuating the diaphragm; a lower valve housing configured to mate with the upper housing, the lower housing having an interior defining a fluid passage and a weir, the weir configured to sealingly contact to diaphragm; and means for supporting the weir. The plastic diaphragm may further comprises means for supporting a portion of the upper and lower housings, said housing support means secured to the upper and lower housings.

An object and advantage of particular embodiments of the present invention is to provide a plastic diaphragm valve with improved dimensional resilience and a method of manufacturing such a valve.

Another object and advantage of particular embodiments of the present invention is to provide for a fluoropolymer diaphragm valve that is dimensionally tolerant to repeated sterilization processes.

Another object and advantage of particular embodiments of the present invention is to provide for a valve that is able to withstand repeated sterilization processes and that is also suitable to use in the pharmaceutical, biotechnological, chemical, and/or semiconductor industries.

Another object and advantage of particular embodiments of the present invention is to provide a means for reinforcing a plastic valve.

Another object and advantage of particular embodiments of the present invention is to provide for a method of reinforcing a plastic valve, thereby having improved resistance to warpage and creapage.

Another object and advantage of particular embodiments of the present invention is to provide a support for the weir of a plastic valve.

Further features, objects and advantages of the present invention will become apparent to those skilled in the art in the detailed description below.

BRIEF DESCRIPTION OF THE DRAWINGS

FIG. 3a is a cross sectional view of a portion of the reinforced diaphragm valve according to an embodiment of the present invention.

DETAILED DESCRIPTION OF THE PREFERRED EMBODIMENTS

Figure 1:
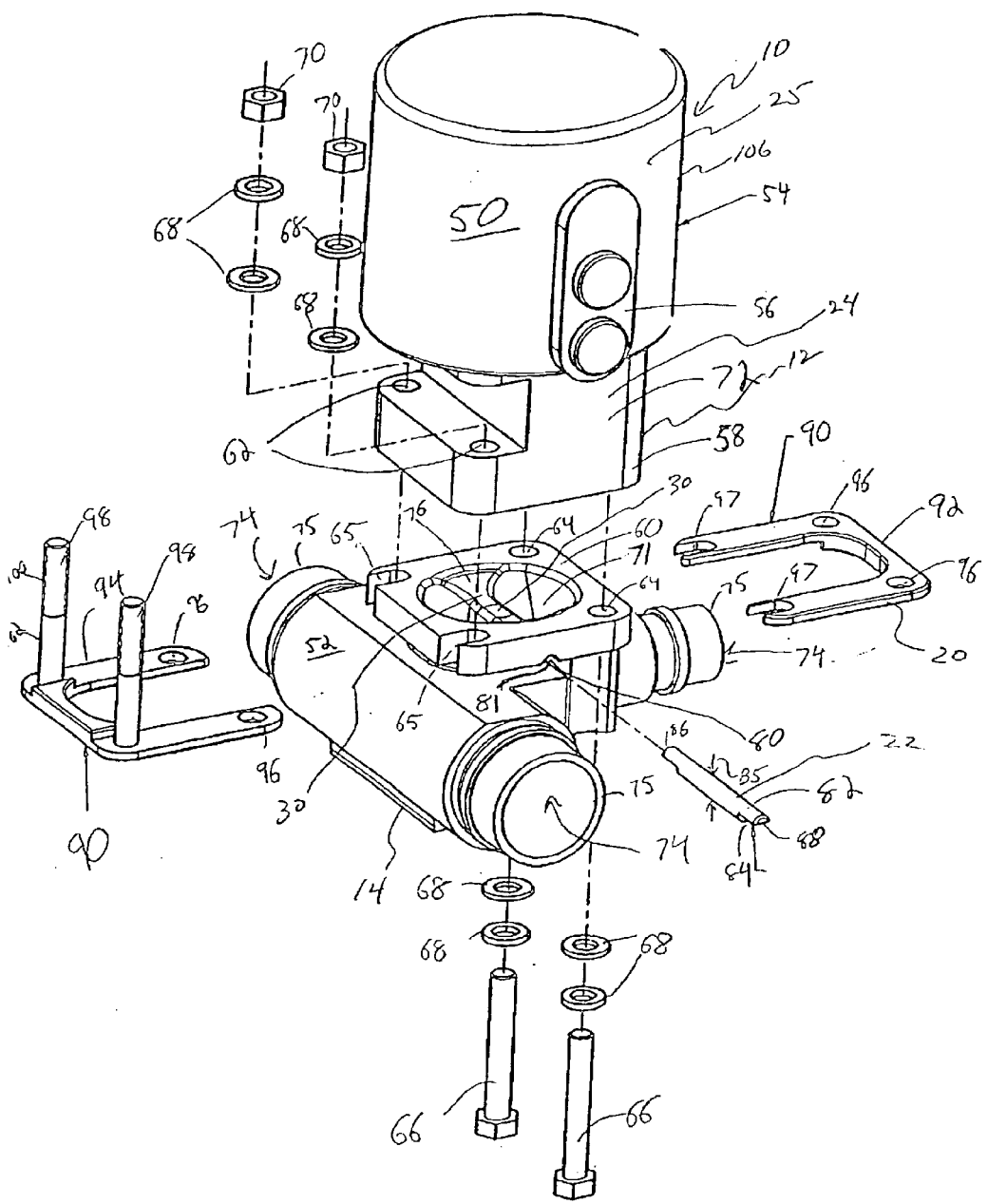
FIG. 1 is an exploded parts view of a diaphragm valve according to an embodiment of the present invention.

A reinforced weir valve 10 in accordance with the invention is illustrated and generally comprises an upper valve portion 12, a lower valve portion 14, a reinforcing exoskeletal framework 20 and an endoskeletal support member 22 configured as a valve seat reinforcing member. The valve has a valve body 24 or housing, an actuator 25, a valve member 26 and valve seat 30. In the preferred embodiment illustrated, the valve 10 is a diaphragm valve and the valve body comprises a plastic upper valve housing or body 50 and a plastic lower valve body 52. The upper valve body 50 has an actuator housing 54 with actuation connection means 56, for example, pneumatic line connectors. Connected to the actuator housing 54 is an upper valve housing 72 and an upper flange 58 with a plurality of upper mounting holes 62.

The lower valve body 52 has a lower flange 60 with a plurality of lower mounting holes 64 and mounting slots 65. The lower valve body 52 has a fluid passageway 74 extending through an open interior 71 of the body 52 with a pair of inlet/outlets 75. A seating surface 76 is located within the lower valve body 52 and also within the fluid passageway 74. The seating surface is part of the valve seat 30 configured as a weir, which spans the open interior 71. The seating surface 76 is sized to cooperate with the diaphragm 104 and the actuator 106 to form a fluid tight seal at the weir 78. The lower valve body 52 further includes an aperture 80 that extends from the exterior 53 of the lower valve body 52. The aperture 80 preferably forms a bore 81 that begins at the exterior 53 of the lower valve body 52 and extends through at least the length of the seating surface 76. The length of the bore 81 extends through the weir 78 and is not exposed to the fluid passageway 74.

Figure 4:
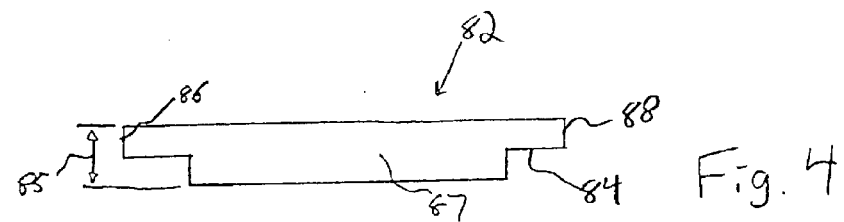
FIG. 4 is a side view of the weir support member according to one embodiment of the present invention.
Figure 7:
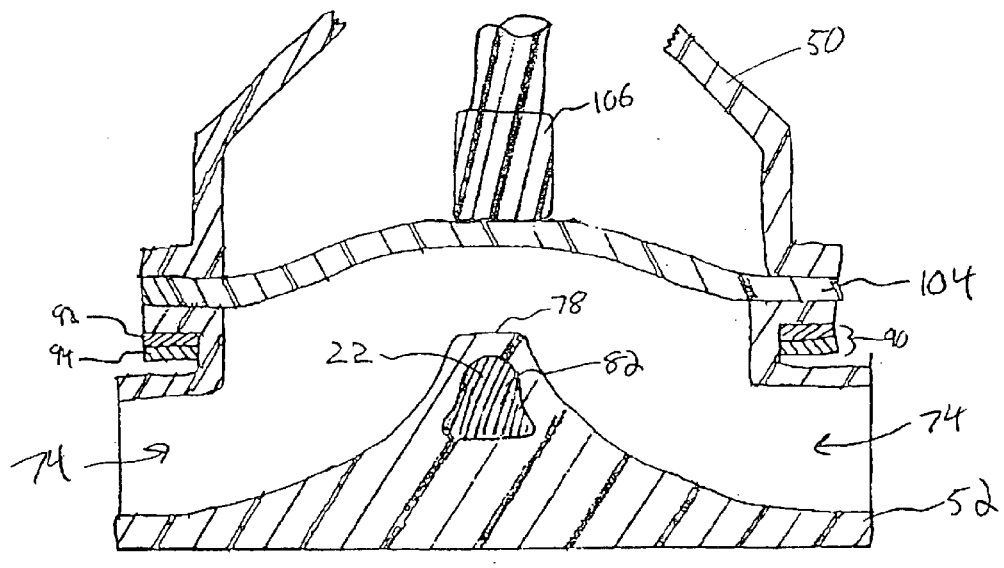
FIG. 7 is a cross sectional view of a portion of a reinforced diaphragm valve according to an embodiment of the present invention.

The valve is reinforced, or supported, by the provision of the endoskeletal support member 22 and is configured as a weir support member 82 and the exoskeletal framework 20 configured as support collar 90. The weir support member 82, as shown in FIG. 4, is preferably rod shaped having a first end 86, a second end 88, a longitudinal surface 87 and notches 84 in the longitudinal surface 87 at both ends 86, 88. As shown in FIG. 7, the weir support member 82 may also be any suitably shaped elongated member. Those skilled in the art will recognize that many alternative embodiments of weir support member shape, such as polygonal, will provide the envisioned support without departing from the scope of the present invention.

Figure 5:
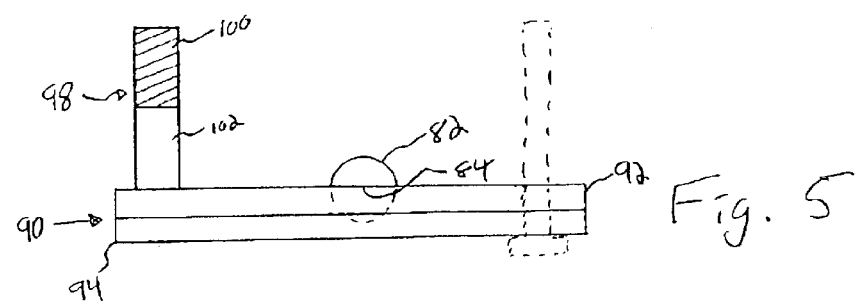
FIG. 5 is a side view of the weir support member of FIG. 4 engaging the support collar.

The support collar 90, shown in FIGS. 1 and 5, comprises an upper portion 92 and a lower portion 94. The upper portion 92 and lower portions 94 are preferably approximately U-shaped and overlap when placed on the valve housing. There are a plurality of collar mounting holes 96 and slotted mount holes 97 in the upper portion 92 that correspond to respective upper mounting holes 62, lower mounting holes 64 and mounting slots 65. The slotted mount holes 97 aide in joining the upper portion 92 to the lower portion 94 and the valve bodies 50, 52 during assembly.

The lower portion 94 may be provided with two mounting posts 98 that cooperate with the mounting slots 65 and upper mounting holes 62 of the valve bodies 50, 52 and slotted mount holes 97 of the upper portion 92 for enabling the joining of the valve bodies 50, 52. The mounting posts 98 have a threaded portion 100 and a smooth portion 102 to provide a means for fastening the valve bodies 50, 52 together. The lower portion 94 also has two collar mounting holes 96 that communicate with respective collar mount holes 96 of the upper portion 92, the upper mounting holes 62 of the upper valve body 50 and the lower mounting holes 64 of the lower valve body 52.

Figure 3B:
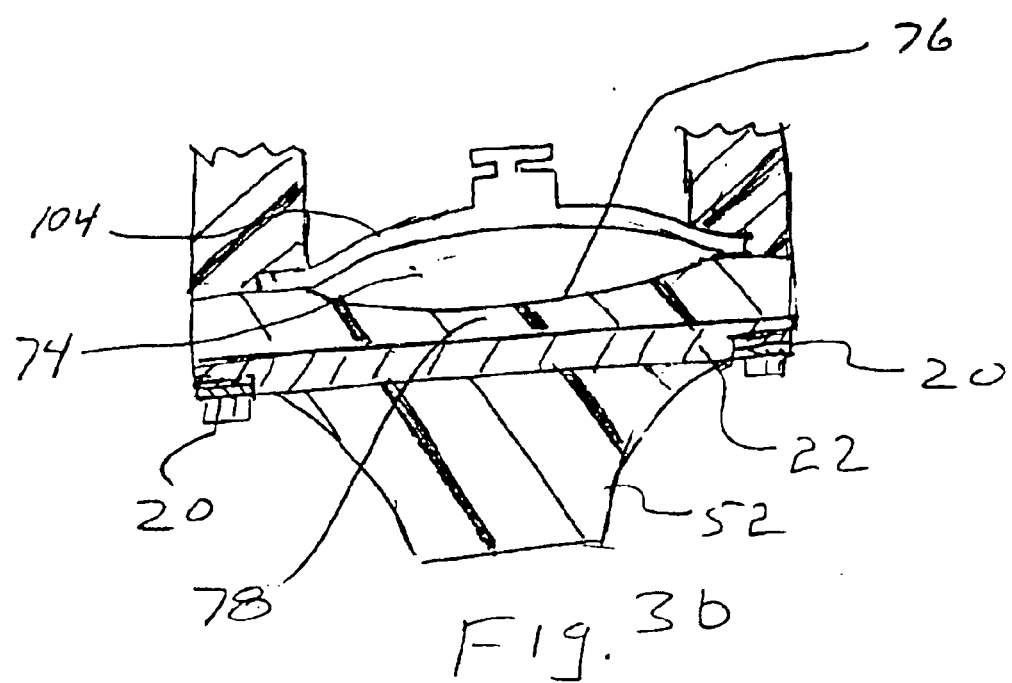
FIG. 3b is a cross sectional view of a portion of the reinforced diaphragm valve of FIG. 3a taken at line 3b—3b.

Referring to FIG. 3a, the diaphragm valve has a diaphragm 104 in a disengaged position. The compressor 106 is configured to provide pressure on the diaphragm 104 when called to close the fluid passageway 74. The compressor 106 shown is a partial hemispherical type compressor that has a similar cross section through 360 degrees of rotation. FIG. 7 shows a blade-type actuator 107 that is an alternative to the partial hemispherical actuator of FIG. 3. The blade type actuator 107 spans the length of the weir 78 and has a width approximately equal to the weir 78. Those skilled in the art will recognize that other embodiments of the actuator 106 are functionally equivalent to those depicted and described herein without departing from the scope of the invention.

The compressor 106 is moved by a drive means as in the actuator 25 such as a pneumatic means, electric means, or manual means. U.S. Pat. Nos. 4,977,929, 6,056,264, 5,368,452 and 5,279,328 disclose several suitable drive means for actuators used in weir-type diaphragm valves. U.S. Pat. Nos. 4,977,929, 6,056,264 and 5,368,452 are hereby incorporated by reference.

Figure 6:
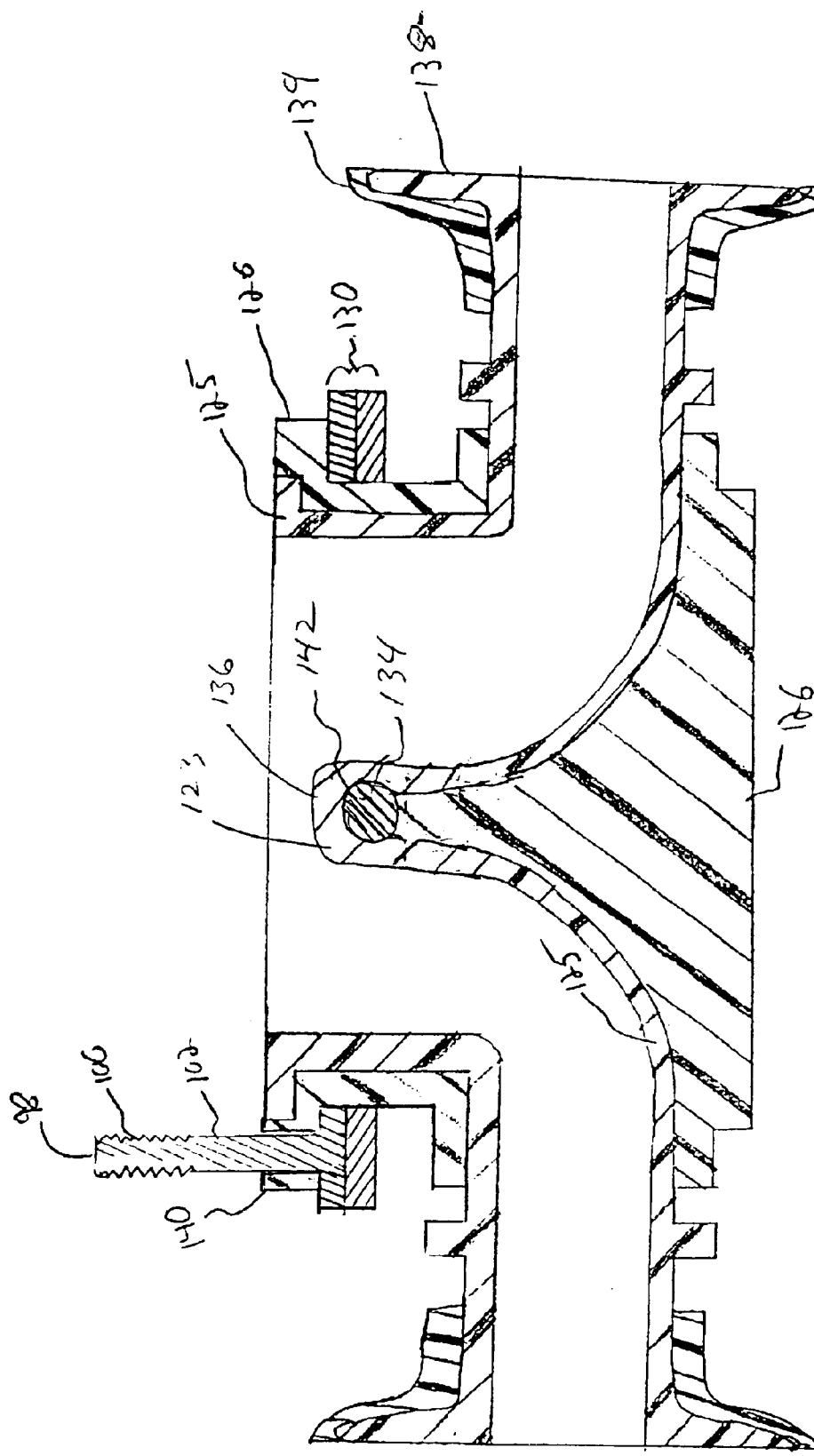
FIG. 6 is a cross sectional view of a lined plastic diaphragm valve according to an embodiment of the present invention.

The diaphragm valve of the present invention can utilize many different types of fittings 108, 138 to join the valve to pipe and piping systems. FIG. 1 shows an Entegris PureBond® fitting. FIG. 6 shows an Entegris Synergy® type sanitary fitting that utilizes an overmolded plastic portion on the fittings. Entegris Flaretek® fittings are also suitable to the present invention. These marks are all registered to Entegris, Inc. the owner of the instant application. U.S. Pat. Nos. 4,848,802, 4,929,293, 5,472,244 and 5,837,180 all disclose examples of suitable fittings for coupling a plastic valve to tubing. These four patents are incorporated herein by reference. Other fittings also may be suitable.

Referring to FIG. 4, a side view of the weir support member 82 is shown.

Referring to FIG. 5, the weir support member 82 is shown in cooperation with the support collar 90. The notch 84 seats on the upper portion 92 to support the weir support member 82 and retaining the member in the aperture 80 in the lower body. The overlapping portion 92, 94 provide uniform support at the bottom surface 117 of the flange 60 and allow the collar to be the function equivalent of a unitary collar. The overlapping configuration allows the compression of the upper and lower valve bodies as provided by each of the bolts 66 or studs 68 to act on a large area of the flanges. The cooperation of the weir support member 82 and the support collar 90 provide support and reinforcement to the weir 78, the valve flanges, and generally, the valve bodies 50, 52. Thus, warpage and creep of the weir, the flanges and generally the valve bodies is inhibited.

Referring to FIG. 6, an alternative embodiment of the present invention is illustrated. A plastic valve body 126 is provided with a plastic fluoropolymer lining 125. The valve body 126 has a weir 136 and a weir base portion 134. A weir support member 142 contacts the weir base portion 134 and the plastic lining 125, thereby supporting the weir 136. The support collar 130 engages the mounting flange 140 of the valve body 126. The lining 125 terminates in fittings 138 for attachment to pipe or piping systems. The fitting 138 of FIG. 6 includes a support ring 139. Valve body 126 is adapted to receive an upper valve body 50 such as that shown in FIG. 1 and described herein.

The valve bodies 50 and 52 are preferably formed of fluoropolymers, including but not limited to perfluoroalkoxy resin (PFA), polyvinylidene fluoride (PVDF) or other fluoropolymers. In certain applications, other plastics may be suitable, such as polyvinyl chloride (PVC), or polypropylene (PP). The body components are preferably injection molded, although they may be machined. The wetted portion of the diaphragm 104 may be formed of polytetrafluoroethylene (PTFE). The diaphragm may be composite with a layer adjacent the PTFE layer formed of EPDM. The weir support member 82 and the support collar 90 are preferably constructed of stainless steel. Stainless steel provides the desirable amount of rigidity and durability to provide the plastic valve with the desired amount of dimensional integrity. In certain instances, other rigid materials such as carbon fiber filled PEEK or other polymers may be utilized. Those skilled in the art will recognize that the above structures may be constructed from other materials without departing from the scope of the invention.

Figure 2:
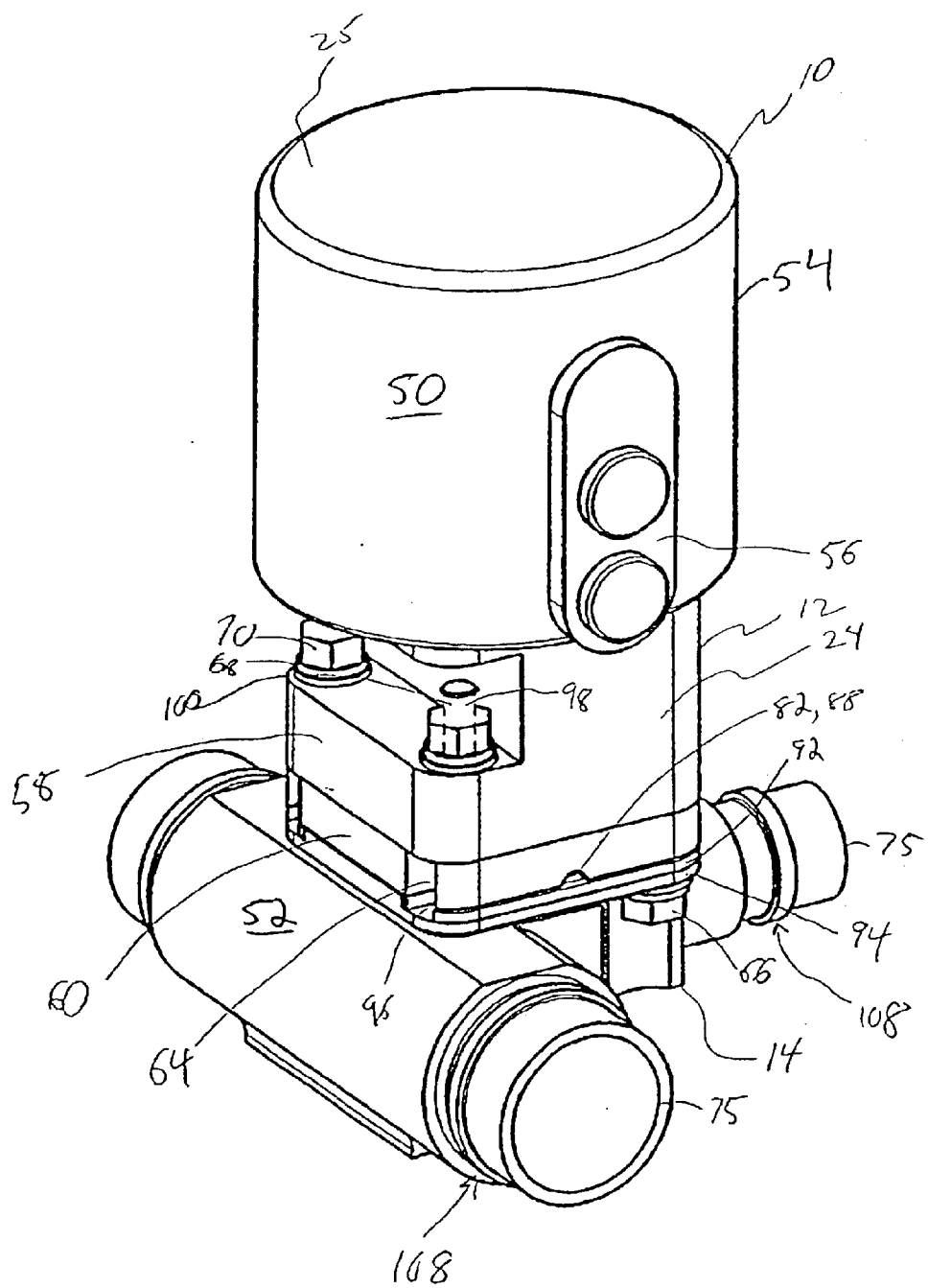
FIG. 2 is a perspective view of the assembled diaphragm valve of FIG. 1.

The reinforced valve according to one embodiment of the present invention is assembled as shown in the assembly drawing of FIG. 1, resulting in the completed valve of FIG. 2. The weir support member 82 is first inserted into the aperture 80 so that the notches 84 face away from the lower flange 60. The lower portion 94 of the support collar 90 is next disposed about the lower flange 60 on the lower valve body 52 so that the collar mount holes 96 align with the lower mounting holes 64. Next, the upper portion 92 is inserted into the space between the lower portion 94 and the lower flange 60. The slotted mount holes 97 engage the mounting posts 98 when the collar mount holes 96 align with the lower mounting holes 64 and the collar mount holes 96 of the lower portion 94.

The upper valve body 50 is next placed onto the assembled lower valve body 52. Two of the upper mounting holes 62 receive the mounting posts 98 and the remaining upper mounting holes 62 are aligned with respective mounting holes 64 and 96. When the upper flange 58 is in contact with the lower flange 60, the threaded portions 100 of the mounting posts 98 will protrude from the upper mounting holes 62 in the upper flange 58. A plurality of washers 68 are placed over the threaded portions 100 and a nut 70 is tightened onto each of the exposed threaded portions 100. Finally, bolts 66, or other suitable fastener, receive a plurality of washers 68 and are inserted though the remaining aligned mounting holes 96, 64, 62 and tightened. Preferably the diaphragm housing is provided with threaded bores to receive the bolts 66.

In operation, the diaphragm 104 confronts valve seating surface 76 and moves by the actuator 25 including the compressor 106. The diaphragm 104 approaches the seating surface 76 until a seal is formed by engagement with the seating surface 76. Such sealing creates a fluid tight separation of the fluid flow between the halves of the valve body defined by the weir 78. The valve is opened by displacing the diaphragm 104 from the seating surface 76 and the weir 78.

Figure 8:
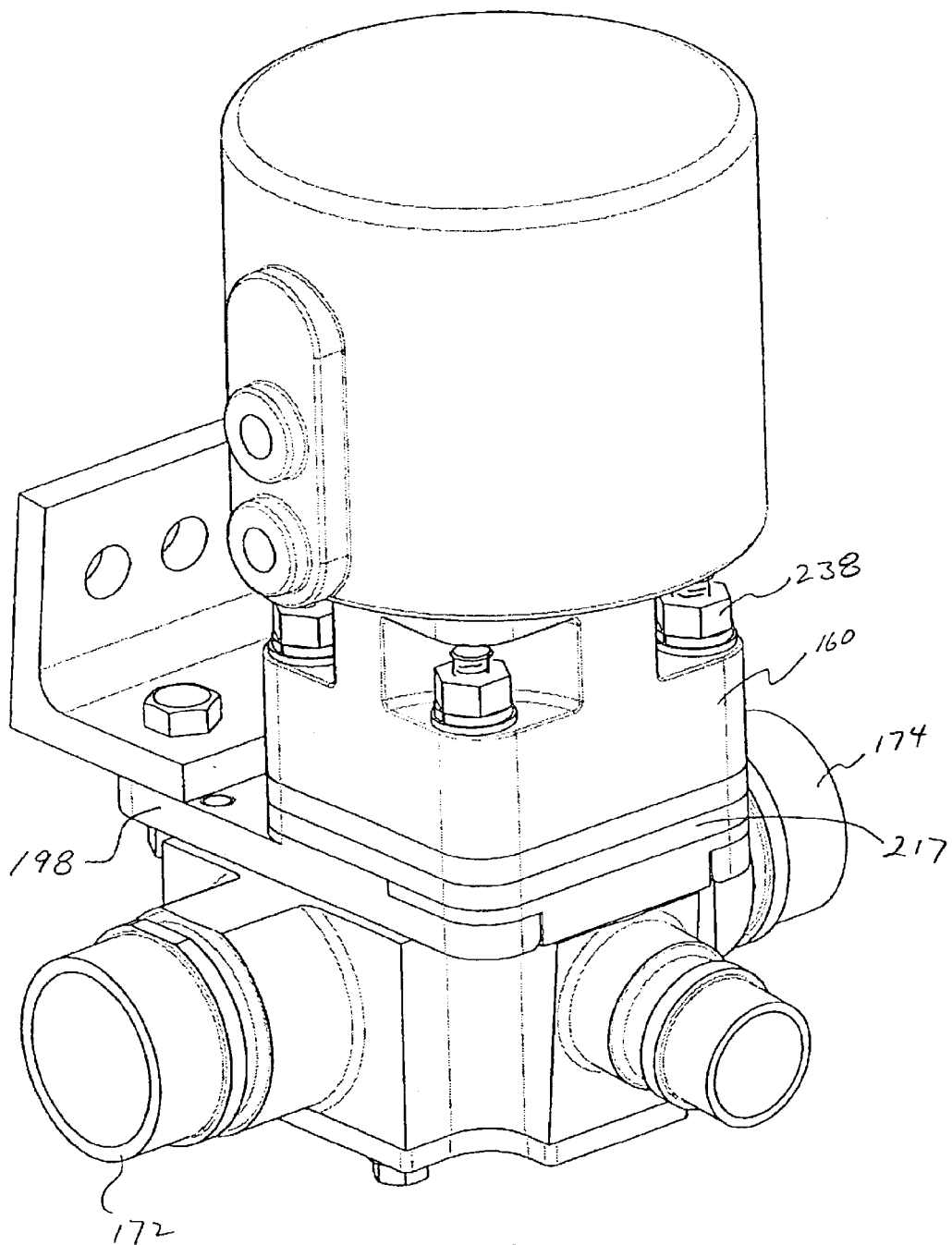
FIG. 8 is a perspective view of a reinforced diaphragm valve having a reinforcing framework according to an embodiment of the present invention.
Figure 9:
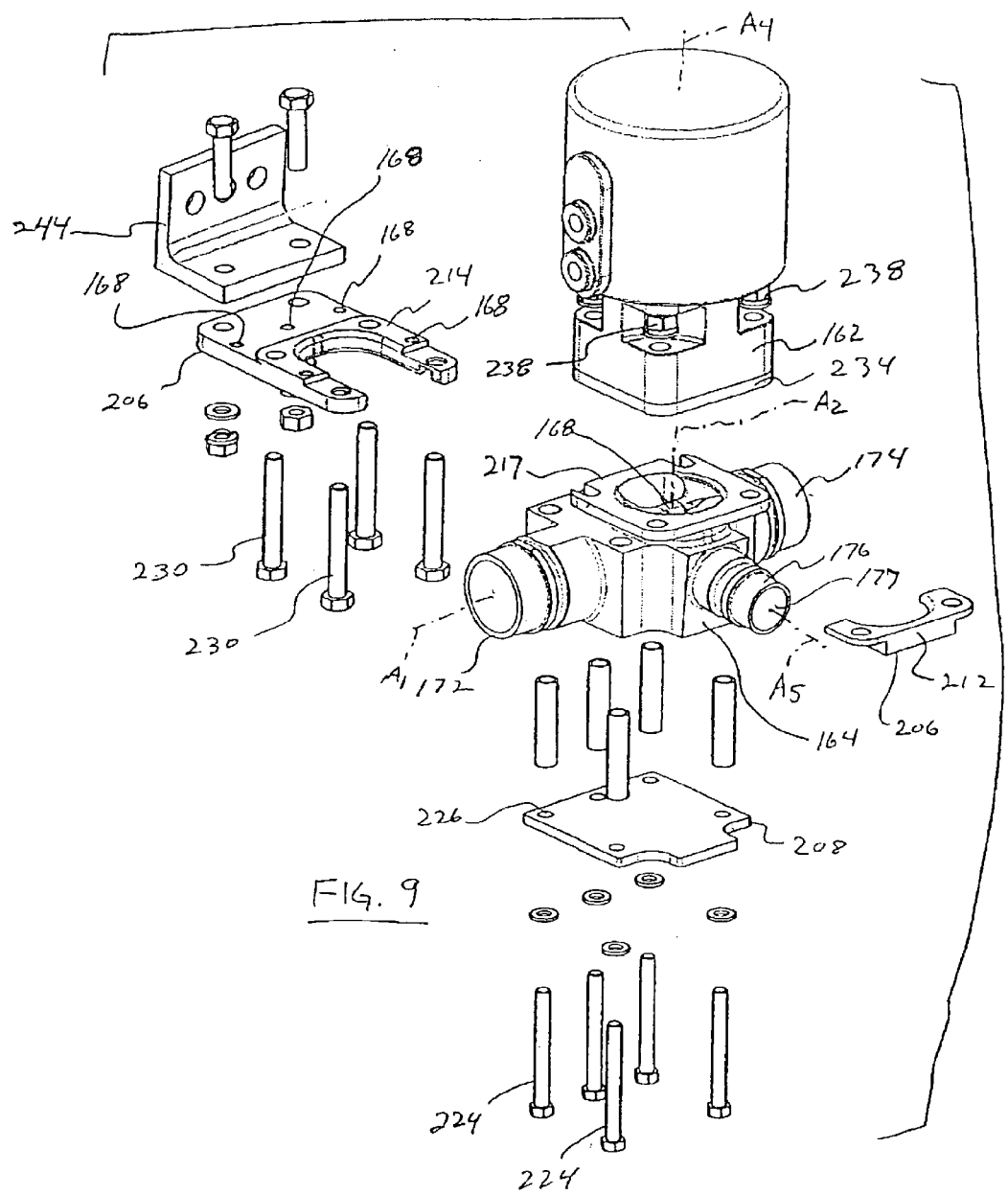
FIG. 9 is an exploded parts view of the reinforced diaphragm valve of FIG. 8.
Figure 10:
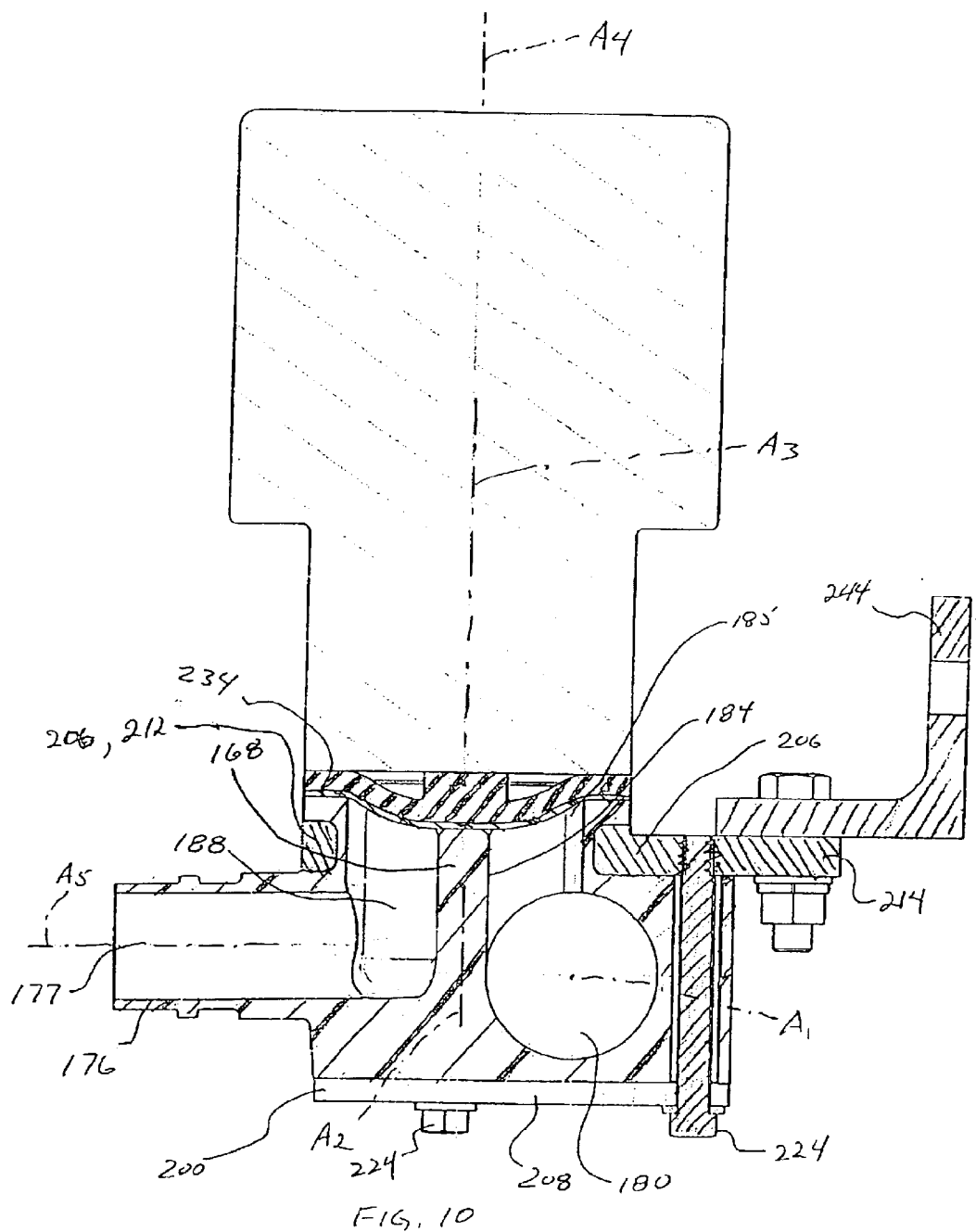
FIG. 10 is a cross sectional view of a portion of the reinforced diaphragm valve of FIG. 8.

Referring to FIGS. 8, 9 and 10, a further embodiment of a valve 158 is illustrated. This embodiment similarity has a valve body 160 comprised of an upper valve body portion 162 and a lower valve body portion 164. The lower valve body portion has an integral weir 168, a first flow duct 172 with a first flow passage 173, a second flow duct 174 with a second flow passage 175, and a third flow duct 176 with a third flow passage 177. The first and second flow ducts are contiguous and collinear and together with the lower valve body define a central flow passage 180 that has a central flow passage axis $A_1$. Said central flow passage connects to fourth flow passage extending along one face 184 of the weir 168, to the open interior 185 above the weir where the diaphragm moves. A fifth flow passage 188 connects to the third flow passage 177 and extends up to the other face 190 of the weir to the open interior 185 above the weir The weir has a central axis $A_2$ centrally located through said weir. Said weir axis $A_2$ is preferably coaxial with an actuator axis $A_3$ and a valve axis $A_4$. The actuator will typically have a pneumatic cylinder or manual rotatable shaft that defines said actuator axis. The third flow duct and third flow passage have a third flow passage or duct axis $A_5$. The actuator axis A3, valve axis $A_4$, and weir axis $A_2$ are displaced from and at preferably a right angle to the central flow duct axis $A_1$.

The valve 158 of FIGS. 8, 9 and 10 has reinforcing framework 198 comprising an exoskeleton framework 200. The exoskeleton framework comprises a flange support ring 206, a lower valve body support plate 208. The flange support ring 206 has two U-shaped segments 212, 214. The U-shaped segments overlap to define a ring portion that engages the flange 217 of the lower valve body 164.

In the embodiment of FIGS. 8, 9 and 10, five bolts 224 extend through apertures 226 in the lower plate 208, through the lower valve body portion 164 and into threaded holes 168 in the flange support ring 206. Additional bolts 230 extend through the flange retainer ring through the lower valve body flange 217, through the diaphragm flange 234, through the upper valve body portion 162 and attach to nuts 238. A further mounting bracket 244 may be utilized to attach the flange ring 206 to a suitable mounting surface.

Although the present invention has been described with reference to preferred embodiments, workers skilled in the art will recognize changes may be made in form and detail without departing from the spirit and scope of the invention.

What is claimed is:

1. A diaphragm valve apparatus comprising:
   an upper valve body containing an actuator,
   a resilient diaphragm;
   a lower valve body configured to mate with the upper valve body, the lower valve body having an interior defining a fluid passage,
   the lower valve body comprising an integral weir, the weir configured to sealingly contact the diaphragm;
   a weir support member extending longitudinally through the weir for reinforcing said weir; and
   a support collar secured to both the upper housing and lower housing, the support collar engaged with the weir support member.

2. The apparatus of claim 1, wherein the support collar comprises
   a U-shaped upper portion; and
   a U-shaped lower portion, the two portions overlapping and forming a closed loop and extending around the lower valve body.

3. The apparatus of claim 1, wherein the support collar is constructed of stainless steel.

4. The apparatus of claim 1, wherein the weir support further comprise a first and second end and at least one of said first and second ends having a notch therein for engaging with the support collar.

5. The apparatus of claim 1, wherein the plastic upper valve body contains the resilient diaphragm.

6. The apparatus of claim 5, wherein the resilient diaphragm is an integral part of the plastic upper valve body.

7. The apparatus of claim 1, wherein the upper valve body and the lower valve body are plastic.

8. A diaphragm valve apparatus comprising:
   an upper valve housing, the upper housing including means for actuating the diaphragm;
   a resilient diaphragm;
   a lower valve housing configured to mate with the upper housing, the lower housing having an interior defining a fluid passage and a weir, the weir configured to sealingly contact the diaphragm;
   means for supporting the weir; and
   a support collar secured to both the upper housing and lower housing, the support collar engaged with the means for supporting the weir.

9. The apparatus of claim 8, further comprising means for supporting a portion of the upper and lower housings, said housing support means secured to the upper and lower housings.

10. The apparatus of claim 8, wherein the upper valve housing contains the resilient diaphragm.

11. The apparatus of claim 10, wherein the resilient diaphragm is an integral part of the upper valve housing.

12. The apparatus of claim 8, wherein the upper valve housing and the lower valve housing are plastic.

13. A plastic diaphragm valve apparatus comprising:
   a plastic upper valve body,
   a resilient diaphragm and an actuator contained in the upper valve body;
   a plastic lower valve body configured to mate with the upper valve body, the lower valve body having an interior defining a fluid passage,
   the lower valve body comprising an integral weir, the weir configured to sealingly contact the diaphragm;
   a weir support member extending longitudinally through the weir for reinforcing said weir; a support collar secured to both the upper housing and lower housing, the support collar engaged with the weir support member.

14. The apparatus of claim 13, wherein the support collar comprises
   a U-shaped upper portion; and
   a U-shaped lower portion, the two portions overlapping and forming a closed loop and extending around the lower valve body.

15. The apparatus of claim 13, wherein the support collar is constructed of stainless steel.

16. The apparatus of claim 13, wherein the weir support further comprise a first and second end and at least one of said first and second ends having a notch therein for engaging with the support collar.

* * * * *